UNITED STATES PATENT OFFICE.

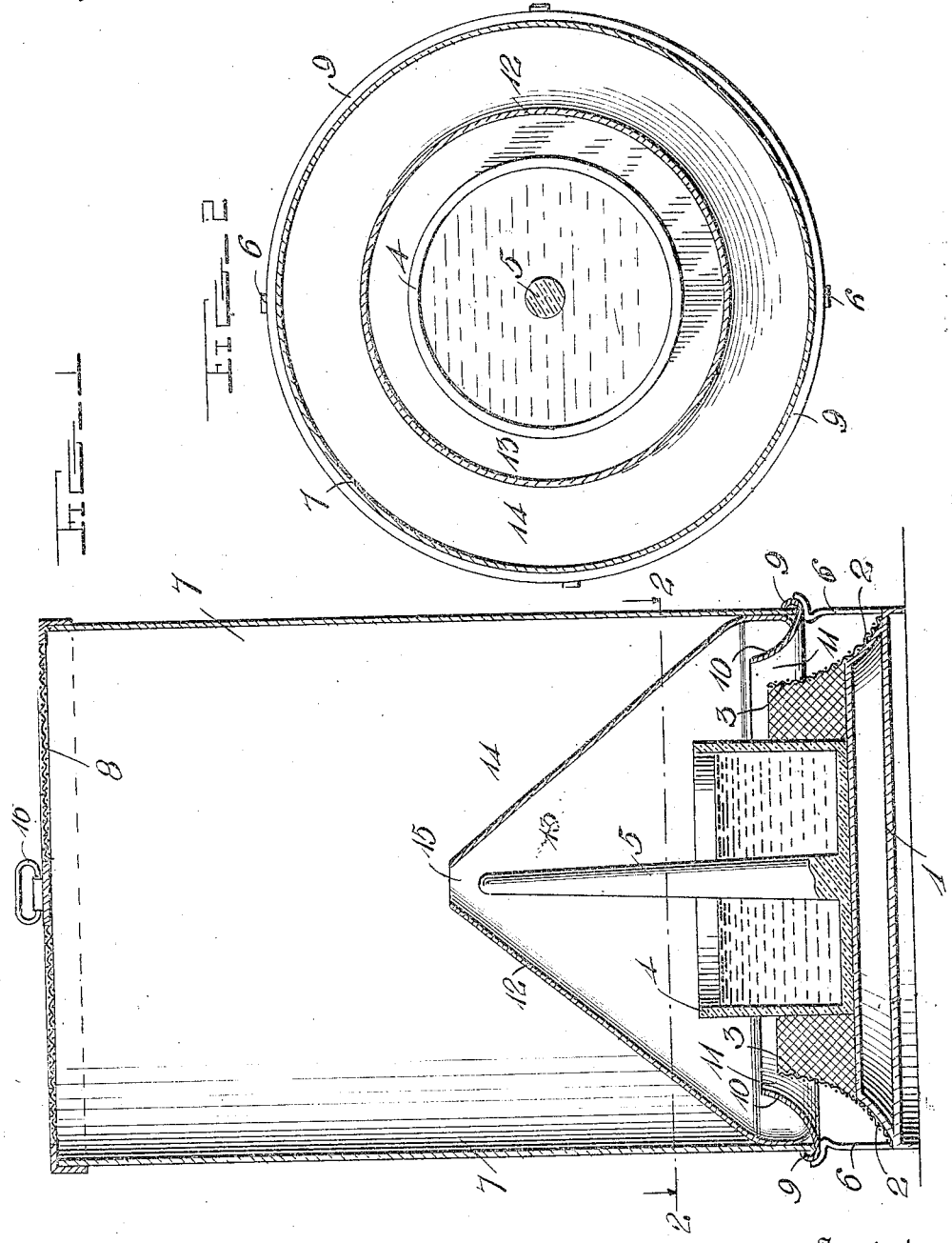

HENRY TURNER, OF RICHMOND, VIRGINIA.

FLY-TRAP.

No. 920,696.  Specification of Letters Patent.  Patented May 4, 1909.

Application filed July 13, 1908. Serial No. 443,225.

*To all whom it may concern:*

Be it known that I, HENRY TURNER, a subject of the King of Great Britain, residing at Richmond, in the county of Henrico and State of Virginia, have invented certain new and useful Improvements in Fly-Traps; and I do declare the following to be a full, clear, and exact description of the invention, such as will enable others skilled in the art to which it appertains to make and use the same.

My invention relates to traps and particularly to fly traps.

The object of the invention is to increase the efficiency of a device of this character and to construct a device which may be manufactured cheaply and which may be readily cleaned.

With the foregoing and other objects in view, the invention consists of certain novel features of construction, combination and arrangement of parts, as will be more fully described and particularly pointed out in the appended claims.

In the drawings, Figure 1 is a vertical section of the device; Fig. 2 is a horizontal section on the line 2—2 of Fig. 1.

Referring more especially to the drawing, 1 represents a suitable base which is preferably circular in form and is inclined on its sides as at 2 to form a suitable outline for the guard 3 which extends up into the casing as will be hereinafter described. This guard is foraminous and while it may be constructed of any suitable material is preferably made of wire screen. In the center of the base I provide a suitable tank 4 which is adapted to receive liquid of any character such as molasses, syrup or the like which will attract the flies to the trap, and will drown them.

Projecting upwardly from the center of the receptacle 4 is a tapering pole or pin 5 which reaches up approximately one-half the height of the trap for a purpose which will be hereinafter described. Extending up from the base adjacent its outer edge and at suitable points around its circumference, I provide supporting legs 6 upon which the casing 7 is removably mounted. This casing comprises a cylindrical body open at its bottom and provided at its top with a foraminous or glass cover 8 which will admit the light so as to attract the flies to the upper part of the trap.

The lower edge of the cylinder 7 is engaged by a suitable bead 9 formed upon a guard 10 preferably in the form of a cone and preferably converging toward the guard 3 so as to provide a restricted opening or passage 11 which will be sufficient only to allow the insects to pass inwardly toward the vessel 4.

Seated on top of the guard 10 and removably mounted in the cylinder 7 is a cone 12 which separates the cylinder 7 into two compartments 13 and 14 which may be termed the vestibule and the main chamber of the trap.

The upper or top portion of the cone is provided with an opening 15 which is located directly over the apex of the pin or pole 5. While it will be understood that the trap may be composed of any suitable material, I preferably construct the same of sheet metal and make the cover 8 of screen wire with a sheet metal band around its periphery so as to tightly engage the outer side of the cylinder. The cover may be provided with any suitable means for locking the same on the cylinder such as a bayonet joint or the like, and is preferably provided with a handle 16 by which the cylinder and cover may be lifted from the legs 6.

It will be further understood that while I have shown the receptacle and base rigidly attached to one another, these parts may be made removable so as to facilitate the cleaning of the device.

In operation the flies, attracted by the liquid in the receptacle 4, ascend the guard 3 and enter the vestibule of the trap 13 by the restricted passage way 11. Herein they are attracted by the light coming through the opening 15 in the cone 12 and, after obtaining their fill of the bait, ascend the pin 5 and fly through the aperture 15 in the cone into the room or chamber 14 from which there is no exit.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

In a trap the combination with a base, of a foraminous guard extending upwardly from the base, supporting legs extending upwardly from the base, a casing removably supported upon said legs, an inwardly extending guard removably carried upon said legs and forming with the first mentioned guard a restricted passage way into the casing, a cone supported upon said second guard and having an aperture at its apex, a bait pan carried upon the base interiorly of the first mentioned guard, a pole extending upwardly from the interior of the bait pan to a point adjacent the aperture in the cone, and a non-opaque cover for the casing.

In testimony whereof I have hereunto set my hand in presence of two subscribing witnesses.

HENRY TURNER.

Witnesses:
J. E. NORVELL,
J. W. WILLIAMS.